(12) United States Patent
Takeda et al.

(10) Patent No.: US 7,274,150 B2
(45) Date of Patent: Sep. 25, 2007

(54) LIGHTING CONTROL CIRCUIT FOR VEHICLE LIGHTING EQUIPMENT

(75) Inventors: Hitoshi Takeda, Shizuoka (JP); Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 36 days.

(21) Appl. No.: 11/225,730

(22) Filed: Sep. 13, 2005

(65) Prior Publication Data

US 2006/0061303 A1 Mar. 23, 2006

(30) Foreign Application Priority Data

Sep. 17, 2004 (JP) ............... 2004-271201

(51) Int. Cl.
*H05B 37/00* (2006.01)
(52) U.S. Cl. ............... 315/77; 315/294; 315/295; 315/307
(58) Field of Classification Search ........... 315/291, 315/294, 295, 296, 307, 77
See application file for complete search history.

(56) References Cited

U.S. PATENT DOCUMENTS 6,153,980 A 11/2000 Marshall et al.
6,870,325 B2 * 3/2005 Bushell et al. ............. 315/224

FOREIGN PATENT DOCUMENTS

| DE | 199 29 165 A1 | 1/2000 |
| DE | 198 41 490 A1 | 3/2000 |
| JP | 11-331494 | 11/1999 |
| JP | 2002-25784 | 1/2002 |
| JP | 2004-9826 | 1/2004 |
| JP | 2004-134147 | 4/2004 |

OTHER PUBLICATIONS

Patent Abstracts of Japan, Publication No. 11-331494, Publication Date: Nov. 30, 1999, 1 page.
Patent Abstracts of Japan, Publication No. 2002-025784, Publication Date: Jan. 25, 2002, 1 page.
Patent Abstracts of Japan, Publication No. 2004-009826, Publication Date: Jan. 15, 2004, 1 page.
Patent Abstracts of Japan, Publication No. 2004-134147, Publication Date: Apr. 30, 2004, 1 page.
Patent Abstracts of Japan, Publication No. 2000-033729, Publication Date: Feb. 2, 2000, 2 pages.
German Office Action issued for German application No. 10 2005 044 437.7-31 mailed on Dec. 7, 2005 and English translation thereof, 10 pages.

* cited by examiner

*Primary Examiner*—David H. Vu
(74) *Attorney, Agent, or Firm*—Osha•Liang LLP

(57) ABSTRACT

An LED is connected to a power supply circuit, and a Zener diode is reverse-connected to the LED and then packaged in an LED package. When a load of the power supply circuit is lightened due to disconnection in the LED package, an output voltage of the power supply circuit shows a rising tendency. However, the power supply circuit limits the maximum voltage applied to the LED within a specified range between a forward voltage of the LED and a forward voltage+a Zener voltage of the Zener diode to prevent current flow through the Zener diode. As a result, no current flows through a resistor R1, then an NPN transistor is turned on, and then the LED acting as a disconnection sensing indicator lamp is turned on.

6 Claims, 4 Drawing Sheets

LIGHTING CONTROL CIRCUIT FOR VEHICLE LIGHTING EQUIPMENT

BACKGROUND OF THE INVENTION

1. Technical Field

The present invention relates to a lighting control circuit for vehicle lighting equipment and, more particularly, a lighting control circuit for vehicle lighting equipment constructed to control the lighting of a semiconductor light source that is formed of a semiconductor light emitting device.

2. Related Art

In the prior art, as the vehicle lighting equipment, the equipment using a semiconductor light emitting device such as LED (Light Emitting Diode), or the like as a light source is known. Also, the vehicle lighting equipment of this type is equipped with a lighting control circuit that controls the lighting of the LED. In constructing the headlamp using the LED as a light source, as modes of a combination of the LED and the lighting control circuit for the vehicle lighting equipment (power supply circuit) to control the lighting of the LED, the mode (one line drive) in which the lighting control circuit for the vehicle lighting equipment (power supply circuit) is connected across a plurality of series-connected LEDs and then the same current is supplied to all LEDs from one lighting control circuit for the vehicle lighting equipment (power supply circuit), the mode in which the unit for turning on one LED or a plurality of series-connected LEDs by one lighting control circuit for the vehicle lighting equipment is provided in plural, and others may be applied.

In case the headlamp is constructed in accordance with any one of the above modes, the LED(s) must be packaged onto the substrate, or the like. However, when the worker's hand, etc. are charged with static electricity upon packaging the LED(s) onto the substrate, or the like, in some cases an overvoltage generated due to the static electricity is applied to the LED(s) to bring about the breakdown of LED.

Therefore, in order to protect the LED from the static electricity, it was proposed to connect the capacitor, the resistor, and the Zener diode in parallel with the LED (see JP-A-11-331494 (page 3 to page 4, FIG. 1)).

Meanwhile, after the headlamp using a plurality of LEDs as a light source is constructed by packaging a plurality of LEDs onto the substrate, or the like, the luminous intensity distribution characteristics of the headlamp is changed when a part of LEDs is broken down. Therefore, a function of informing the driver of the effect that the LED is broken down when any one of LEDs is broken down must be added. In other words, in the case where the headlamp is constructed by a plurality of LEDs, when only a part of the LEDs is broken down and the remaining LEDs are still turned on, it is difficult for the driver to know that a part of LEDs is broken down, based on a change of the luminous intensity distribution characteristics of the headlamp.

In sensing the breakdown of LED, normally the current is not supplied to the LED at all when the wiring of the LED is disconnected, for example. Therefore, if a current sensor for sensing that the current is reduced or the current becomes zero is provided and then an indicator lamp is turned on based on a sensed output of this sensor, the indicator lamp can inform the driver of the fact that the LED is broken down.

SUMMARY OF THE INVENTION

However, even though the fact that no current is supplied is sensed to sense the breakdown of the LED, sometimes the breakdown of the LED cannot be sensed. More particularly, when the wiring (lead wire) connected to the LED is disconnected, the disconnection of the LED can be sensed by sensing the fact that no current is supplied to the LED. However, when the disconnection is generated in the LED package, sometimes such disconnection cannot be sensed. For example, in the case where the semiconductor chip constituting the light emitting device and the Zener diode connected in parallel with the semiconductor chip are packaged in the LED package, the current is still supplied via the Zener diode even when either the semiconductor chip or the bonding wire is broken down or disconnected. Thus, sometimes such disconnection cannot be sensed.

More specifically, since no current is supplied to the semiconductor chip when such semiconductor chip in the LED package is broken down, a load of the power supply circuit is lessened and thus a voltage applied across the LED package rises. When the rising voltage exceeds a forward voltage of the LED and then reaches a Zener voltage of the Zener diode, the current starts to flow through the Zener diode and thus the voltage applied across the LED package changes from the forward voltage of the LED to the Zener voltage. When N LED packages are connected in series, the voltage applied across the overall LED packages changes from the forward voltage×N to (the forward voltage×(N−1)+the Zener voltage) When the current flows through the Zener diode, the power supply circuit executes the control so as to supply the same current to respective LEDs. As a result, a high voltage is applied across the LED package in which the semiconductor chip is broken down, then a consumption power in such LED package is increased owing to the high voltage, and then thermal breakdown of the Zener diode is caused in some cases. The Zener voltage is lowered by the thermal breakdown of the Zener diode and becomes thermally stable at a voltage that is lower than the forward voltage of LED.

That is to say, when the disconnection is generated not in the wiring but in the LED package in which the Zener diode is employed as the static protection, the current continues to flow via the Zener diode. Therefore, even if the current sensor for sensing that the current is not supplied to the LED is provided, sometimes the breakdown of LED cannot be sensed without fail.

One or more embodiments of the present invention sense certainly a disconnection of a semiconductor light source to which a static protecting element is connected in parallel.

In accordance with one or more embodiments, a lighting control circuit for vehicle lighting equipment, comprises controlling means for controlling a current and a voltage applied to a semiconductor light source while using an input voltage as a luminous energy of the semiconductor light source; and disconnection sensing means for outputting a disconnection sensing signal when the current of the semiconductor light source shows an abnormal value; wherein, in a condition that N (N is a positive integer) semiconductor light sources are series-connected and also a static protecting element is connected to the N semiconductor light sources in parallel respectively, the controlling means limits a maximum voltage applied to the N semiconductor light sources within a range from (a forward voltage of the semiconductor light source×N) to (a forward voltage of the semiconductor light source×(N−1)+an operating voltage of the static protecting element).

(Effect) When the disconnection occurs in any semiconductor light source of the N semiconductor light sources, the load of the controlling means is lightened and the voltage applied across the N semiconductor light sources shows a rising tendency. However, the maximum voltage applied across the N semiconductor light sources can be limited within the range from (the forward voltage of the semiconductor light source×N) to (the forward voltage of the semiconductor light source×(N−1)+the operating voltage of the static protecting element), the voltage increase in the N semiconductor light sources can be suppressed, and it can be suppressed that the voltage in excess of an operating voltage of the static protecting element of the disconnected semiconductor light source is applied to the static protecting element. Therefore, no current flows through the static protecting element attached to the disconnected semiconductor light source, and thus a disconnection sensing signal is output from the disconnection sensing means when the current of the semiconductor light source shows an abnormal value, e.g., when the current is reduced smaller than a set current or when the current becomes zero. As a result, even though the disconnection occurs in the wiring in the inside (e.g., the semiconductor chip or the bonding wire) of the semiconductor light source or the wiring connected to the semiconductor light source, such disconnection of the semiconductor light source can be sensed without fail. Also, because the current does not flow through the static protecting element attached to the broken semiconductor light source, thermal breakdown of the static protecting element can be prevented.

In accordance with one or more embodiments, a lighting control circuit for vehicle lighting equipment comprises controlling means for controlling a current and a voltage applied to N (N is a positive integer) semiconductor light sources in a state that the N series-connected semiconductor light sources to which a static protecting element is connected in parallel respectively is used as a load; disconnection sensing means for outputting a disconnection sensing signal when the current of the N semiconductor light sources shows an abnormal value; and N auxiliary disconnection sensing means for outputting the disconnection sensing signal when a voltage across the N semiconductor light sources is decreased lower than forward voltages of the N semiconductor light sources respectively.

(Effect) In the case where a plurality of semiconductor light sources are driven in a full line, when the number of the semiconductor light sources (LEDs) connected in series becomes large, the voltage applied across the N semiconductor light sources cannot be sufficiently limited under control of the controlling means because of variation of the forward voltage or the operating voltage of the static protecting element or the temperature characteristics. In such case, when the current of the semiconductor light source shows an abnormal value, e.g., when the current is reduced smaller than a set current or when the current becomes zero until a current starts to flow through the static protecting element attached to the disconnected semiconductor light source after the semiconductor light source is disconnected, the disconnection sensing signal is output from the disconnection sensing means. Therefore, even though the disconnection occurs in the wiring in the inside (e.g., the semiconductor chip or the bonding wire) of the semiconductor light source or in the wiring connected to the semiconductor light source, such disconnection of the semiconductor light source can be sensed surely. In contrast, when the static protecting element, for example, is thermally broken due to the current flowing through the static protecting element connected to the disconnected semiconductor light source, the voltage across the semiconductor light sources is reduced lower than the forward voltage. Therefore, if it is sensed by the auxiliary disconnection sensing means that this voltage across the semiconductor light sources is reduced lower than the forward voltage, the disconnection of the semiconductor light source can be sensed certainly.

In accordance with one or more embodiments, lighting control circuit for vehicle lighting equipment comprises controlling means for controlling a current and a voltage applied to N (N is a positive integer) semiconductor light sources in a state that the N series-connected semiconductor light sources to which a static protecting element is connected in parallel respectively is used as a load; disconnection sensing means for outputting a disconnection sensing signal when the current of the N semiconductor light sources shows an abnormal value; a plurality of voltage drop sensing means for sensing that a total sum of voltages across a plurality of semiconductor light sources is decreased lower than a total sum of forward voltages of the plurality of semiconductor light sources, while selecting the plurality of semiconductor light sources out of the N semiconductor light sources as a sensed object; and a voltage drop logical means for outputting a logical sum of sensed outputs of the plurality of voltage drop sensing means as the disconnection sensing signal.

(Effect) In the case where a plurality of semiconductor light sources are driven in a full line, when the number of the semiconductor light sources (LEDs) connected in series becomes large, the voltage applied across the N semiconductor light sources cannot be sufficiently limited under control of the controlling means because of variation of the forward voltage or the operating voltage of the static protecting element or the temperature characteristics. In such case, when the current of the semiconductor light source shows an abnormal value, e.g., when the current is reduced smaller than a set current or when the current becomes zero until a current starts to flow through the static protecting element attached to the disconnected semiconductor light source after the semiconductor light source is disconnected, the disconnection sensing signal is output from the disconnection sensing means. Therefore, even though the disconnection occurs in the wiring in the inside (e.g., the semiconductor chip or the bonding wire) of the semiconductor light source or in the wiring connected to the semiconductor light source, such disconnection of the semiconductor light source can be sensed surely. In contrast, when the static protecting element, for example, is thermally broken due to the current flowing through the static protecting element connected to the disconnected semiconductor light source, the voltage across the semiconductor light sources is reduced lower than the forward voltage. Then, in the case where plural semiconductor light sources, e.g., two semiconductor light sources or more, out of the N semiconductor light sources are allocated as a sensed object, when the disconnection occurs in any semiconductor light source of the sensed object, a total sum of the voltages across the semiconductor light sources as the sensed object is reduced lower than a total sum of the forward voltages of plural semiconductor light sources. Therefore, if it is sensed by a plurality of voltage drop sensing means that a total sum of the voltages across plural semiconductor light sources is reduced lower than a total sum of the forward voltages of plural semiconductor light sources and then a logical sum of sensed outputs of a plurality of voltage drop sensing means is output, the disconnection of the semiconductor light sources can be sensed without fail. Also, since plural semiconductor light sources are allocated as the sensed object, a simplification of the structure and a reduction in the number of wirings can be achieved with respect to the case where a single semiconductor light source is selected as the sensed object.

In accordance with one or more embodiments, the lighting control circuit for vehicle lighting equipment further comprises a plurality of controlling means and a plurality of disconnection sensing means provided to correspond to the plurality of semiconductor light sources in a state that the N series-connected semiconductor light sources are provided in series; and a disconnection sensing logical means for outputting a logical sum of sensed outputs of the plurality of disconnection sensing means as the disconnection sensing signal.

(Effect) A plurality of controlling means and a plurality of disconnection sensing means provided to correspond to a plurality of semiconductor light sources, and then a logical sum of the sensed outputs of a plurality of disconnection sensing means is output from the disconnection sensing logical means. Therefore, it can be sensed surely that the disconnection occurs in any semiconductor light source.

As apparent from the above explanation, embodiments of the present invention include one or more of the following advantages. In accordance with one or more embodiments, the disconnection of the semiconductor light source can be sensed surely and also the thermal breakdown of the static protecting element can be prevented.

In accordance with one or more embodiments, even in a state that a plurality of semiconductor light sources are driven in one line, it can be sensed surely that the disconnection occurs in any semiconductor light source.

In accordance with one or more embodiments, even in a state that a plurality of semiconductor light sources are driven in one line, it can be sensed surely that the disconnection occurs in any semiconductor light source and also a simplification of configuration and a reduction in the number of wirings can be achieved rather than the case where one semiconductor light source is selected as the sensed object.

In accordance with one or more embodiments, in a state that a plurality of semiconductor light sources are provided, it can be sensed surely that the disconnection occurs in any semiconductor light source.

DETAILED DESCRIPTION OF THE INVENTION

Figure 1:
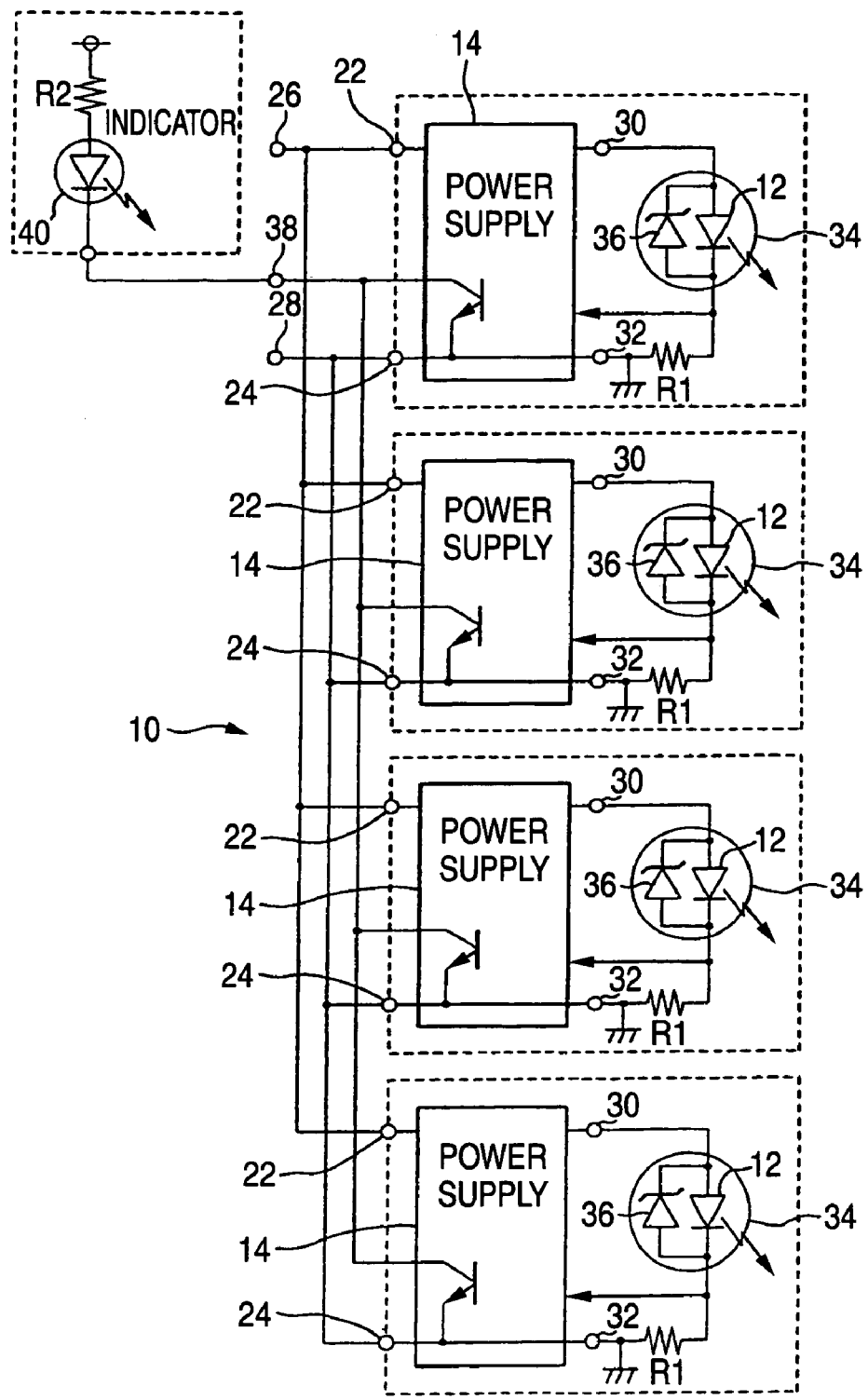
FIG. 1 A block circuit diagram of a lighting control circuit for vehicle lighting equipment showing a first embodiment of the present invention.
Figure 2:
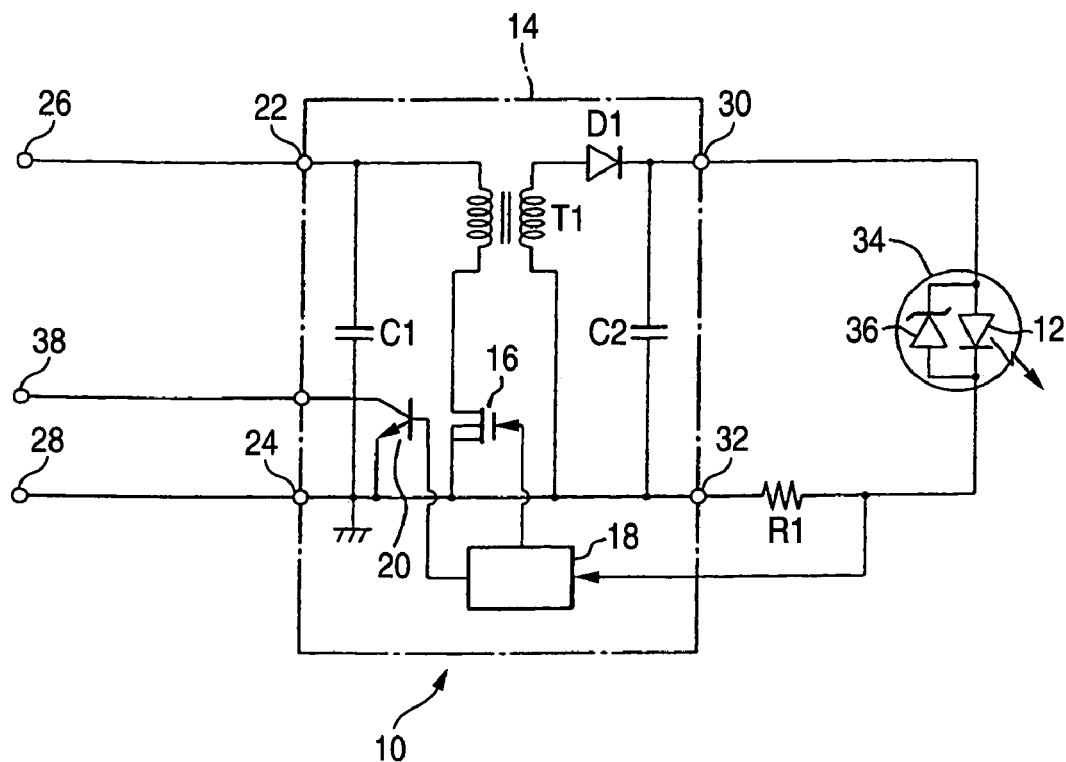
FIG. 2 A circuit diagram of a power supply circuit.
Figure 3:
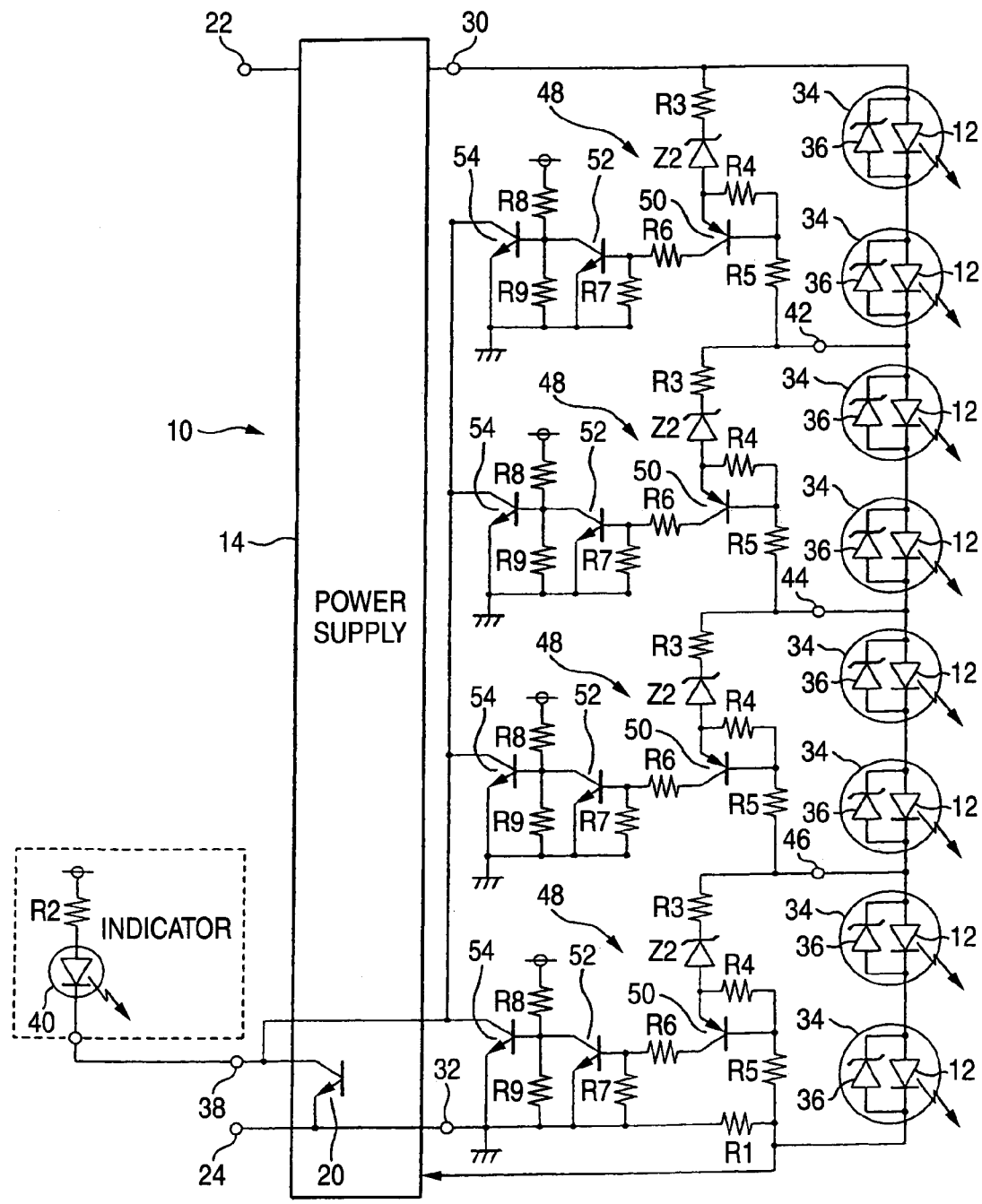
FIG. 3 A block circuit diagram of a lighting control circuit for vehicle lighting equipment showing a second embodiment of the present invention.
Figure 4:
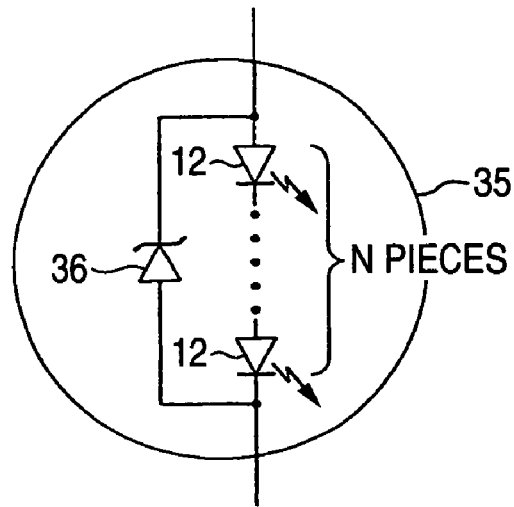
FIG. 4 A circuit diagram of a semiconductor light source constructed by N series-connected LEDs.
Figure 5:
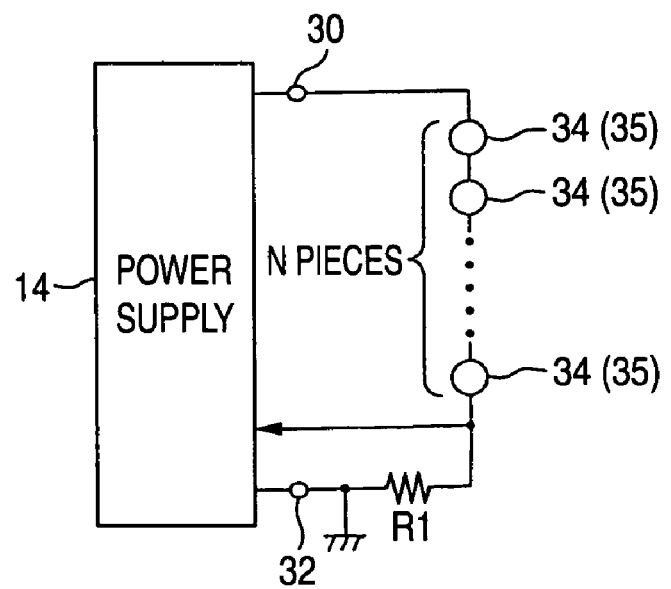
FIG. 5 A circuit diagram of an LED package that is constructed by the N series-connected LEDs and connected to a power supply circuit.

Next, embodiments of the present invention will be explained with reference to examples. FIG. 1 is a block circuit diagram of a lighting control circuit for vehicle lighting equipment showing a first embodiment of the present invention. FIG. 2 is a circuit diagram of a power supply circuit. FIG. 3 is a block circuit diagram of a lighting control circuit for vehicle lighting equipment showing a second embodiment of the present invention. FIG. 4 is a circuit diagram of a semiconductor light source constructed by N series-connected LEDs. FIG. 5 is a circuit diagram of an LED package that is constructed by the N series-connected LEDs and connected to a power supply circuit.

In these Figures, a lighting control circuit 10 for the vehicle lighting equipment is constructed to have four power supply circuits 14 assigned to four LEDs 12 respectively, as an element of the vehicle lighting equipment (light emitting equipment). That is, one power supply circuit 14 is provided to one LED 12.

As shown in FIG. 2, each power supply circuit 14 is constructed to have a transformer T, capacitors C1, C2, a diode D1, a PMOS transistor 16, a control circuit 18, and a disconnection sensing NPN transistor 20. Input terminals 22, 24 are connected to power supply input terminals 26, 28 respectively, and the LED 12 and a current sensing resistor R1 are connected in series and inserted between output terminals 30, 32. The power supply input terminal 26 is connected to a plus terminal of a battery power supply, and the power supply input terminal 28 is connected to a minus terminal of the battery power supply.

Each LED 12 is installed in an LED package 34, as the semiconductor light source that is constructed by the semiconductor light emitting device. A Zener diode 36, for example, is reverse-connected in parallel with the LED 12, as the static protecting element. In this case, as the static protecting element, a capacitor, a resistor, or the like may be employed in place of the Zener diode 36. Also, each LED 12 can be constructed as the light source for various vehicle lighting equipment such as the headlamp, the stop and tail lamp, the fog lamp, the turn-signal lamp, and the like.

A collector of the disconnection sensing NPN transistor 20 is connected to an external connection terminal 38, and also an LED 40 is connected to the external connection terminal 38. The LED 40 is connected to the plus terminal of the battery power supply via a resistor R2, and is placed in the compartment as an indicator lamp.

Each power supply circuit 14 is constructed as a controlling means that controls a current and a voltage applied to each LED 12 while using a battery voltage applied between the input terminals 22, 24 as a luminous energy of each LED 12. Also, each power supply circuit 14 is constructed to execute such a control that a specified current, e.g., a rated current is supplied to each LED 12, and to limit the maximum voltage applied to each LED within a specified range while the LED 12 is turned on.

For example, in the case where one LED 12 is allocated to each power supply circuit 14, such power supply circuit 14 limits the maximum voltage applied to one LED 12 within a range from the forward voltage of the LED 12 to the Zener voltage of the Zener diode 36 (an operating voltage of the static protecting element)

In contrast, in the case where N LEDs 12 (N is a positive integer) are allocated to each power supply circuit 14 and respective LEDs 12 are connected in series mutually, such power supply circuit 14 limits the maximum voltage applied to the N LEDs 12 within a range from the forward voltage of the LED 12×N to (the forward voltage of the LED 12×(N−1)+the Zener voltage of the Zener diode 36).

In other words, when the disconnection in the inside of the LED 12, e.g., the disconnection in the semiconductor chip, the bonding wire, or the like of the LED 12, occurs to lessen the load of the power supply circuit 14, it can be suppressed that the voltage applied across the Zener diode 36 exceeds the Zener voltage of the Zener diode 36.

Therefore, when any LED 12 of a plurality of LEDs 12 is disconnected, the load of the power supply circuit 14 corresponding to this disconnected LED 12 is lightened and thus an output voltage of the power supply circuit 14 shows a rising tendency, nevertheless the maximum voltage applied to the LEDs 12 of the power supply circuit 14 is limited within the specified range. As a consequence, the voltage that exceeds the Zener voltage is never applied across the Zener diode 36 and thus no current flows through the Zener diode 36 even when the disconnection occurs in the inside of the LED 12.

In contrast, when the LED 12 is disconnected, the current flowing through the resistor R1 becomes lower than a set value or becomes zero, and thus this current flowing through the resistor R1 has an abnormal value. Therefore, for example, a compared output is output from a comparator (not shown), which compares the current flowing through the resistor R1 with the set value, in the control circuit 18, then the NPN transistor 20 is turned on in response to this compared output, and then a disconnection sensing is output from the NPN transistor 20. In this case, the disconnection sensing resistor R1, the control circuit 18, and the NPN transistor 20 constitute a disconnection sensing means.

The current is supplied to the LED 40 as soon as the NPN transistor 20 is turned on, and then the LED 40 serving as an indicator lamp is turned on. Therefore, the LED 40 can inform the driver of the fact that the LED 12 was disconnected.

Also, since the collectors of respective NPN transistors 20 are OR-connected mutually and then connected to the external connection terminal 38, each power supply circuit 14 can output a logical sum of outputs of respective NPN transistors 20 as the disconnection sensing signal. In this case, a wired-OR circuit for OR-connecting the collectors of respective NPN transistors 20 mutually constitutes a disconnection sensing logical means that outputs the logical sum of the outputs of respective NPN transistors 20 as the disconnection sensing signal. Therefore, when the NPN transistor 20 in any power supply circuit 14 out of four power supply circuits 14 is turned on, the lighting of the LED 40 can inform the driver of the fact that any LED 12 was disconnected.

Next, a second embodiment of the present invention will be explained with reference to FIG.3. In this embodiment, as the lighting control circuit for vehicle lighting equipment for driving a plurality of LEDs 12 in one line, eight LEDs 12 are series-connected mutually and then both end sides of the series-connected LEDs 12 are connected to one power supply circuit 14. Also, voltage watching terminals 42, 44, 46 are connected every two LEDs out of eight LEDs 12, and four voltage-drop sensing circuits 48 are provided while using two LEDs 12 as the sensed object respectively.

The first voltage-drop sensing circuit 48 is connected between the output terminal 30 of the power supply circuit 14 and the voltage watching terminals 42. The second voltage-drop sensing circuit 48 is connected between the voltage watching terminals 42 and the voltage watching terminal 44. The third voltage-drop sensing circuit 48 is connected between the voltage watching terminal 44 and the voltage watching terminal 46. The fourth voltage-drop sensing circuit 48 is connected between the voltage watching terminal 46 and the output terminal 32 of the power supply circuit 14. Each voltage-drop sensing circuit 48 is constructed as a voltage-drop sensing means for sensing that a total sum of voltages across two LEDs 12 is reduced lower than a total sum of forward voltages of two LEDs 12.

More particularly, each voltage-drop sensing circuit 48 is constructed to have resistors R3, R4, R5, R6, R7, R8, R9, a Zener diode Z2, a PNP transistor 50, and NPN transistors 52, 54. Also, collectors of the NPN transistors 54 are OR-connected mutually and then connected to the external connection terminal 38.

Each voltage-drop sensing circuit 48 monitors the voltage across two LEDs 12 as the sensed object. When a total sum of voltages across two LEDs 12 is in excess of the Zener voltage of the Zener diode Z2, the voltage-drop sensing circuit 48 decides that no disconnection occurs in both LEDs 12 and both LEDs 12 are normally operating. Thus, the PNP transistor 50 is turned on, the NPN transistor 52 is turned on, and the NPN transistor 54 is turned off. As a result, no current is supplied to the LED 40 serving as the indicator lamp and thus the LED 40 is in its inoperative state.

In contrast, when the disconnection occurs in any one of two LEDs 12 and also a total sum of voltages across two LEDs is smaller than the Zener voltage of the Zener diode Z2, the PNP transistor 50 is turned off.

More particularly, when the disconnection in the LED 12, e.g., the disconnection in the inside of the LED package 34 occurs, the load of the power supply circuit 14 is lightened and thus the output voltage of the power supply circuit 14 shows a rising tendency. At that time, the power supply circuit 14 executes the control to limit the maximum voltage of the output voltage within the specified range. In the situation that the number of the LEDs 12 connected to the power supply circuit 14 is increased, sometimes the maximum voltage cannot be limited within the specified range under control of the power supply circuit 14 on account of either a variation in the forward voltage of the LED 12 or the Zener voltage of the Zener diode 36 or their temperature characteristics. In such case, in the wake of an increase in the output voltage of the power supply circuit 14 caused by the disconnection in any LED 12, the current is supplied to the Zener diode 36, to which the broken LED is connected, to bring on the thermal breakdown of the Zener diode. At that time, the voltage across the Zener diode 36 is decreased to the voltage that is lower than the forward voltage of the LED 12.

Accordingly, when the voltage across the LED 12 is lowered because the Zener diode 36 connected to the broken LED 12 is thermally broken down, the PNP transistor 50 is turned off. Then, when the PNP transistor 50 is turned off, the NPN transistor 52 is turned off and also the NPN transistor 54 is turned on. Then, when the NPN transistor 54 is turned on, the disconnection sensing signal is output from the NPN transistor 54, so that the current is supplied to the LED 40 acting as the indicator lamp and then the LED 40 is turned on. As a result, the LED 40 can inform the driver of the fact that the disconnection occurred in any LED 12.

Also, because the collectors of the NPN transistors 54 are OR-connected mutually and connected to the external connection terminal 38, each voltage-drop sensing circuit 48 can output a logical sum of the outputs of the NPN transistors 54 as the disconnection sensing signal. In this case, the wired-OR circuit for OR-connecting the collectors of respective NPN transistors 54 mutually constitutes a voltage drop sensing logical means that outputs the logical sum of the outputs of respective NPN transistors 54 as the disconnection sensing signal. Therefore, when the NPN transistor 54 in any voltage-drop sensing circuit 48 out of four voltage-drop sensing circuits 48 is turned on, the lighting of the LED 40 can inform the driver of the fact that any LED 12 out of eight LEDs 12 was disconnected.

Here, when the disconnection of the wiring connected to the LED 12 occurs, no current flows through the resistor R1 and then the NPN transistor 20 is turned on. Thus, such disconnection of the wiring connected to the LED 12 can be sensed without fail.

Also, when the disconnection occurs in the wirings connected to the voltage watching terminals 42, 44, 46, the PNP transistor 50 is turned off. Therefore, like the disconnection in the LED package 34, the disconnection of the wirings connected to the voltage watching terminals 42, 44, 46 can be sensed.

Also, in the present embodiment, two LEDs 12 are selected as the sensed object. Therefore, the number of the voltage-drop sensing circuits 48 can be reduced rather than the case where one LED 12 is selected as the sensed object, and also the number of the wirings used to the voltage-drop sensing circuits 48 to the voltage watching terminals 42, 44, 46 can be reduced.

Also, such a configuration can be employed, while using one LED 12 as the sensed object, that an auxiliary disconnection sensing circuit as an auxiliary disconnection sensing means, which outputs the disconnection sensing signal when the voltage across the LED 12 is reduced lower than the forward voltage, is connected across each LED 12. In this case, if the Zener diode whose Zener voltage is lower than the case where two LEDs 12 are selected as the sensed object is employed as the Zener diode Z2, such auxiliary disconnection sensing circuit can be constructed by utilizing the similar circuit configuration.

Also, in the above embodiments, as the semiconductor light source acting as the load of the power supply circuit 14, the light source constructed by installing one LED 12 and one Zener diode 36 in the LED package 34 is described. Here, as shown in FIG. 4, such a configuration can be employed as the semiconductor light source that plural (N) series-connected LEDs 12 are packaged in an LED package 35 and then the Zener diode 36 is connected in parallel across the N series-connected LEDs 12. In this case, if a Zener diode having the Zener voltage that is larger than a total sum of the forward voltages of the N LEDs 12 is used as the Zener diode 36, the advantages similar to the above embodiments can also be achieved.

Also, upon constructing the semiconductor light source acting as the load of the power supply circuit 14, such a configuration can be employed that, as shown in FIG. 5, one end side of plural (N) series-connected LED packages 34 or LED packages 35 is connected to the output terminal 30 of the power supply circuit 14 and also the other end side thereof is connected to the output terminal 32 of the power supply circuit 14 via the resistor R1.

We claim:

1. A lighting control circuit for vehicle lighting equipment, comprising:
   controlling means for controlling a current and a voltage applied to a semiconductor light source while using an input voltage as a luminous energy of the semiconductor light source; and
   disconnection sensing means for outputting a disconnection sensing signal when the current of the semiconductor light source shows an abnormal value;
   wherein, in a condition that N (N is a positive integer) semiconductor light sources are series-connected, each semiconductor light source having a static protecting element connected in parallel, the controlling means limits a maximum voltage applied to the N semiconductor light sources within a range from (a forward voltage of the semiconductor light source×N) to (a forward voltage of the semiconductor light source×(N−1)+an operating voltage of the static protecting element).

2. The lighting control circuit of claim 1, further comprising:
   N auxiliary disconnection sensing means for outputting the disconnection sensing signal when a voltage across the N semiconductor light sources is lower than forward voltages of the N semiconductor light sources respectively.

3. A lighting control circuit for vehicle lighting equipment, comprising:
   controlling means for controlling a current and a voltage applied to N (N is a positive integer) semiconductor light sources, each semiconductor light source having a static protecting element connected in parallel, wherein the N series-connected semiconductor light sources are used as a load;
   disconnection sensing means for outputting a disconnection sensing signal when the current of the N semiconductor light sources shows an abnormal value;
   a plurality of voltage drop sensing means for sensing that a total sum of voltages across a plurality of semiconductor light sources is lower than a total sum of forward voltages of the plurality of semiconductor light sources, while selecting the plurality of semiconductor light sources out of the N semiconductor light sources as a sensed object; and
   voltage drop logical means for outputting a logical sum of sensed outputs of the plurality of voltage drop sensing means as the disconnection sensing signal.

4. A lighting control circuit for vehicle lighting equipment, according to claim 1, further comprising:
   plurality of controlling means and a plurality of disconnection sensing means provided to correspond to the plurality of semiconductor light sources in a state that the N series-connected semiconductor light sources are provided in series; and
   disconnection sensing logical means for outputting a logical sum of sensed outputs of the plurality of disconnection sensing means as the disconnection sensing signal.

5. A lighting control circuit for vehicle lighting equipment, according to claim 2, further comprising:
   a plurality of controlling means and a plurality of disconnection sensing means provided to correspond to the plurality of semiconductor light sources in a state that the N series-connected semiconductor light sources are provided in series; and
   a disconnection sensing logical means for outputting a logical sum of sensed outputs of the plurality of disconnection sensing means as the disconnection sensing signal.

6. A lighting control circuit for vehicle lighting equipment, according to claim 3, further comprising:
   a plurality of controlling means and a plurality of disconnection sensing means provided to correspond to the plurality of semiconductor light sources in a state that the N series-connected semiconductor light sources are provided in series; and
   disconnection sensing logical means for outputting a logical sum of sensed outputs of the plurality of disconnection sensing means as the disconnection sensing signal.

* * * * *